(12) United States Patent
Schaupp et al.

(10) Patent No.: US 7,654,555 B2
(45) Date of Patent: Feb. 2, 2010

(54) MODULE FOR AN OCCUPANT-PROTECTION DEVICE OF A MOTOR VEHICLE

(75) Inventors: Jochen Schaupp, Aalen (DE); Alexander Aulbach, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 591 days.

(21) Appl. No.: 10/498,786

(22) PCT Filed: Dec. 2, 2002

(86) PCT No.: PCT/DE02/04489

§ 371 (c)(1),
(2), (4) Date: Apr. 21, 2005

(87) PCT Pub. No.: WO03/049978

PCT Pub. Date: Jun. 19, 2003

(65) Prior Publication Data

US 2005/0225063 A1   Oct. 13, 2005

(30) Foreign Application Priority Data

Dec. 12, 2001 (DE) ................................ 101 62 119
Jul. 23, 2002 (DE) ................................ 102 34 502

(51) Int. Cl.
*B60R 21/16* (2006.01)
(52) U.S. Cl. ..................... 280/728.2; 280/736
(58) Field of Classification Search .............. 280/728.1, 280/728.2, 731, 736
See application file for complete search history.

(56) References Cited

U.S. PATENT DOCUMENTS 4,020,453 A    4/1977  Spies et al.
5,383,682 A *  1/1995  Nagata et al. ............... 280/777
5,662,353 A    9/1997  Bergerson et al.
5,897,133 A *  4/1999  Papandreou ............. 280/728.2
6,056,319 A *  5/2000  Ruckdeschel et al. ....... 280/741

FOREIGN PATENT DOCUMENTS

| | | |
|---|---|---|
| DE | 197 31 219 A1 | 1/1999 |
| EP | 0 904 995 A2 | 3/1999 |
| JP | 6-502826 | 3/1994 |
| JP | 10147748 A * | 6/1998 |
| JP | 2001-47959 | 2/2001 |
| JP | 2001-270411 | 10/2001 |

\* cited by examiner

*Primary Examiner*—Faye M. Fleming
(74) *Attorney, Agent, or Firm*—Foley & Lardner LLP

(57) ABSTRACT

The invention relates to a module (1) for an occupant-protection device of a motor vehicle. Said module containing a functional element (2), which can be activated if the motor vehicle is involved in a collision and which comprises an electrically conductive material and a fixing device (3) mechanically fixing the functional element (2) to the bodywork of the motor vehicle. According to the invention, the functional element (2) is electrically insulated in relation to the bodywork of the motor vehicle. According to the invention, the functional element (2) is electrically insulated in relation to the bodywork of the motor vehicle. This guarantees that the functional element, which can be activated in a collision, cannot electrically interact with the bodywork of the motor vehicle, is particular in the form of a voltage surge. The invention permits the reliability of a module for an occupant-protection device of a motor vehicle to be increased and prevents potential malfunctions in a simple manner.

23 Claims, 5 Drawing Sheets

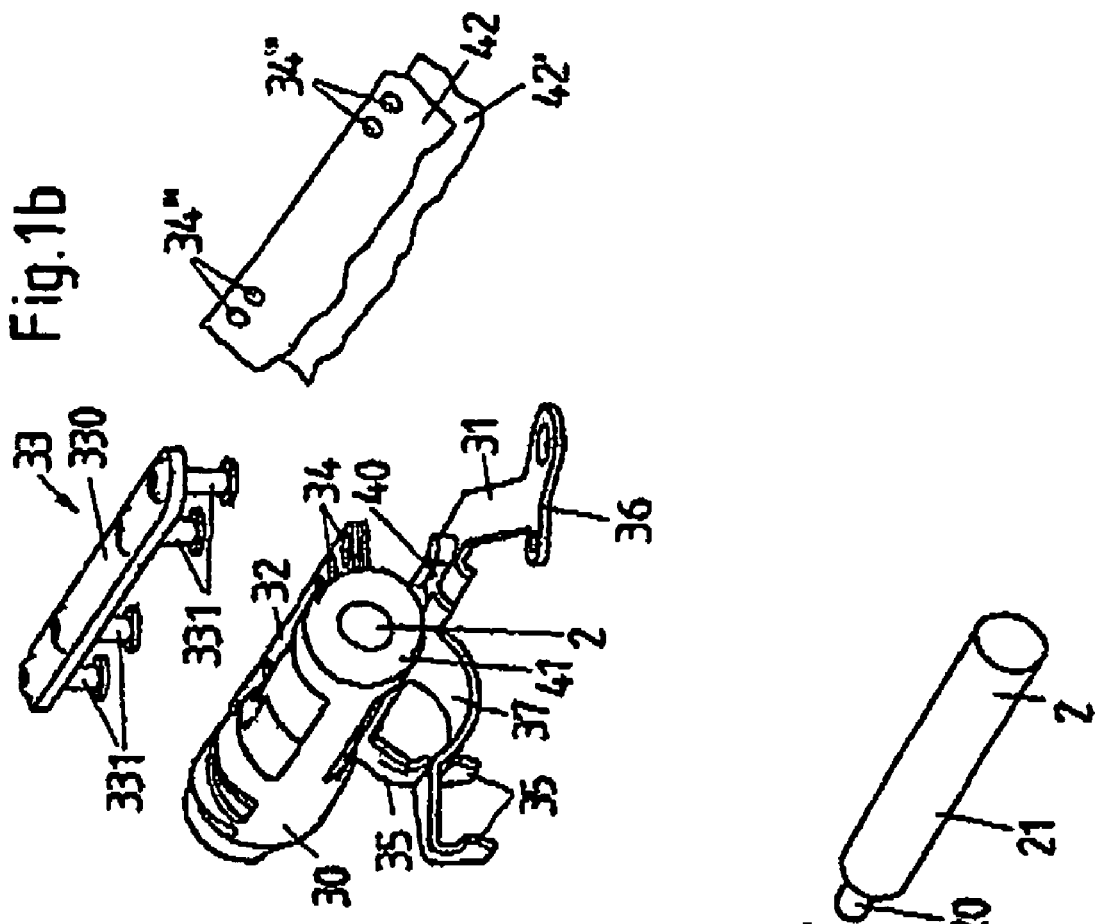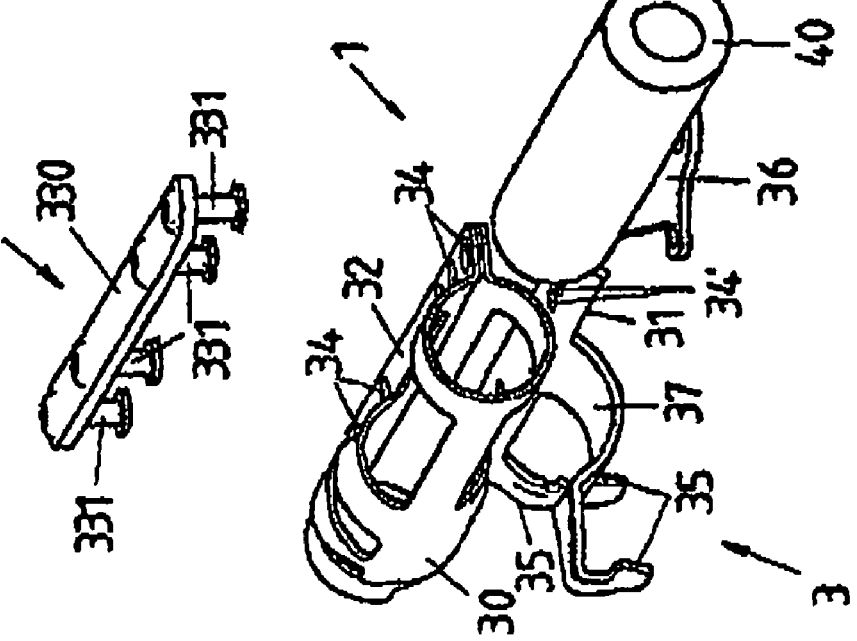

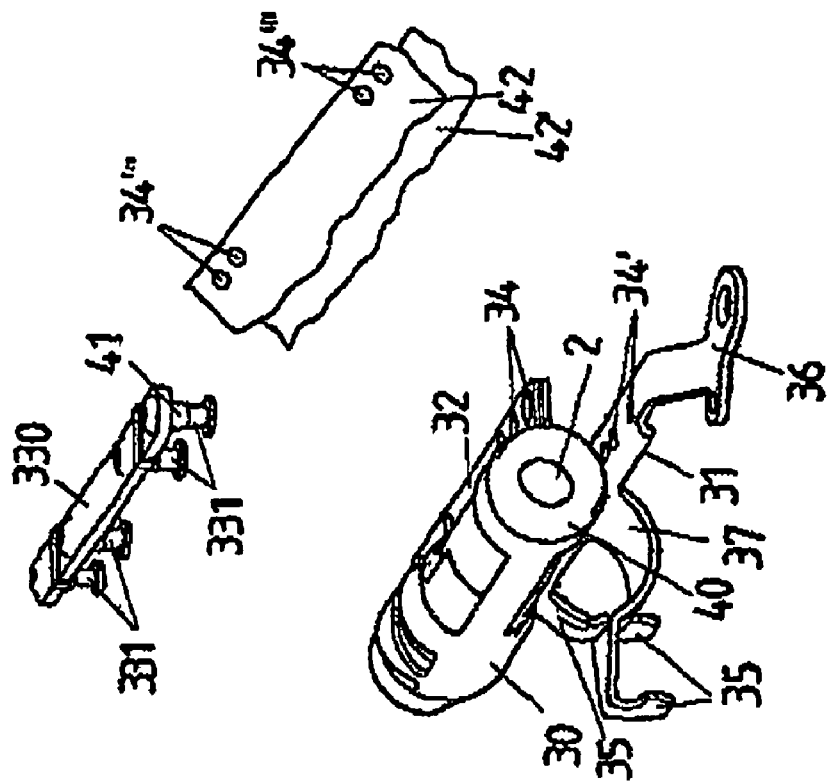
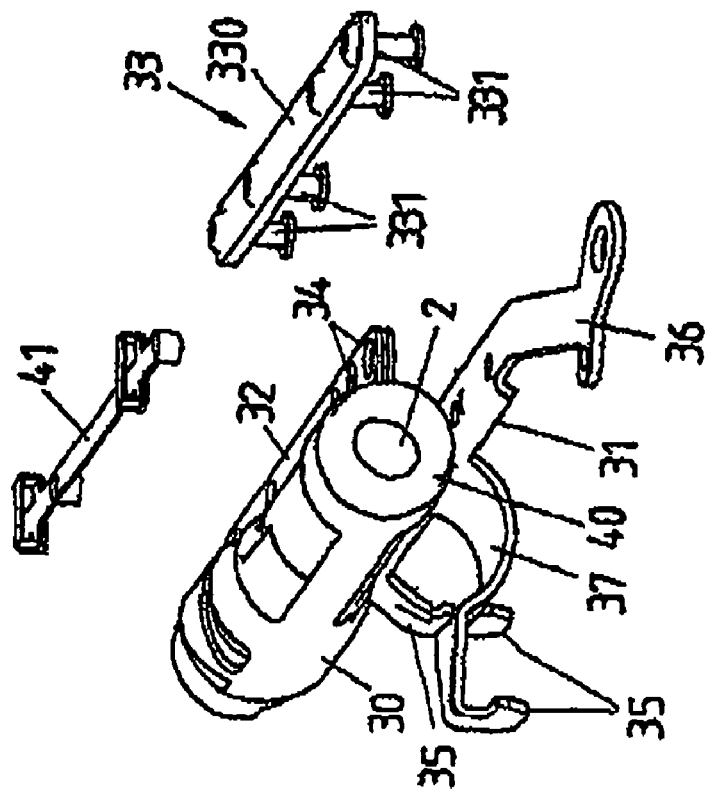

MODULE FOR AN OCCUPANT-PROTECTION DEVICE OF A MOTOR VEHICLE

The invention relates to a module for a vehicle occupant protection device of a motor vehicle as claimed in the preamble of claim 1.

Such a module comprises a functional element which can be activated in the event of the motor vehicle crashing and which has an electrically conductive material and a securing device for mechanically securing the functional element to the bodywork of the motor vehicle.

The vehicle occupant protection device may be designed here in the form of an airbag device. The functional element is then the gas generator which is assigned to the airbag.

It is also conceivable for the vehicle occupant protection device to be formed as a seatbelt pretensioning device for pretensioning a seatbelt in the event of the motor vehicle crashing. The functional element is formed here in particular as a pyrotechnic device for making available the movement which is required for the function of pretensioning the belt.

The modules of the generic type which are known from the prior art have the disadvantage that in the event of an electrical failure a potential and/or a voltage surge starting from the bodywork of the motor vehicle interacts with the functional element via the securing device. This can lead to a situation in which an undesired or indefinable state of the activatable functional element occurs. This results in a situation in which a malfunction of the vehicle occupant protection device is detected in the electronic monitoring system of the vehicle occupant protection device.

In an extreme case it is also conceivable for the functional element to be triggered unintentionally.

The present invention is therefore based on the object of making available a module for a vehicle occupant protection device of a motor vehicle which is easily and cost-effectively protected against a malfunction.

This object is achieved by means of a module having the features of claim 1.

According to the invention there is provision for the functional element to be electrically insulated from the bodywork of the motor vehicle.

This ensures that the activatable functional element is isolated from an electrical interaction with the bodywork of the motor vehicle, in particular in the form of a voltage surge. As a result, the reliability of a module for a vehicle occupant protection device of a motor vehicle can easily be increased and possible malfunctions can be avoided.

In particular if the functional element has an electrical trigger device for activating the functional element in the event of a crash, the electrical trigger device is thus isolated from an electrical interaction with the bodywork of the motor vehicle.

In one preferred embodiment of the module, the functional element is electrically insulated from the bodywork of the motor vehicle by means of an electrically non-conductive securing device. For this purpose, the securing device is fabricated, at least in certain sections, from an electrically non-conductive material.

The module advantageously has separate insulating means which electrically insulate the functional element from the bodywork of the motor vehicle. All electrically non-conductive materials such as, for example, paper, cardboard, textiles, non-conductive plastics and surface coatings and non-conductive plastic film material are suitable for use as separate insulating means.

The separate insulating means are preferably arranged here in such a way that the functional element is electrically insulated from the securing device and/or the securing device is electrically insulated from the bodywork of the vehicle.

One preferred embodiment is characterized in that the insulating means are provided as electrically insulating materials on the functional element, at least in the regions of the functional element which are in mechanical contact with the securing device. For this purpose, the insulating means may be, for example, in the form of plastic layers or surface coating layers which are applied in a non-detachable fashion to the surface of the functional element.

The securing device of the module is preferably embodied in a plurality of parts. In particular, it has a holding device for receiving the functional element and a mounting device which can be mechanically secured to the holding device, for mechanically securing the mounting device to the bodywork of the motor vehicle.

In this context, the insulating means are preferably formed in such a way that they electrically insulate the functional element from the holding device and/or the holding device from the mounting device and/or the mounting device from the bodywork of the motor vehicle.

In one preferred embodiment, the holding device is designed to receive an essentially cylindrical functional element. The cylindrical functional element may be a gas generator. In this context, the insulating means preferably have a hollow cylindrical insulating element which can be arranged between the essentially cylindrical functional element and the holding device. This ensures the electrical isolating between the functional element and the holding device.

In one preferred embodiment, the holding device of the functional element has a flange, directed away from the functional element, which serves for attaching the holding device to the mounting device.

In order to mechanically secure the holding device to the mounting device, the flange of the holding device can have attachment means.

It is also conceivable for the flange of the holding device to be capable of being mechanically secured to the mounting device by means of separate attachment means. In this context, the flange preferably has a plurality of holes for feeding through the attachment means, the mounting device comprising correspondingly arranged holes.

Furthermore, a rail which can be fitted onto the flange and has non-detachable or detachable attachment elements, arranged at a distance from the holes of the flange, preferably serves as attachment means for securing the holding device to the mounting device. The attachment elements can be embodied here, for example, as screws, rivets or latching elements.

Such a module preferably has, as insulating means, an insulating rail for providing electrical insulation between the attachment means and the holding device. For this purpose, the insulating rail is formed, for example, as an element which extends between the rail which can be fitted on and the flange of the holding device, the insulating rail in the region of the holes for the attachment elements engaging in the holes of the holding device and/or in the holes of the mounting device in such a way that the attachment elements are electrically insulated from the holding device and/or from the mounting device.

Alternatively, the insulating rail may be formed as an element which extends between the mounting device and the flange of the holding device, the insulating rail, again in the region of the holes for the attachment elements, engaging in the holes of the mounting device and/or in the holes of the holding device in such a way that the attachment elements are electrically insulated from the holding device.

In one preferred use of the module for an airbag device, a section of the airbag is arranged between the flange of the holding device and the rail which can be fitted on and/or between the flange of the holding device and the mounting device. In this context, holes for feeding through the attachment elements are provided in the sections of the airbag. In this way, the sections of the airbag which are arranged on the flange of the holding device serve simultaneously as additional insulating means which electrically isolates the holding device from the mounting device.

The module according to the invention is preferably intended for use in an airbag unit of a vehicle occupant protection device, the functional element being formed as a gas generator.

The module according to the invention can also be provided for use in an electrically triggerable seatbelt pretensioning device of a seatbelt. In this context, the functional element is provided in particular as a pyrotechnic device which ensures the movement of the seatbelt which is necessary to pretension the seatbelt.

Further features and advantages of the invention are explained by reference to the exemplary embodiments of the module according to the invention which are explained in the figures. In the drawing:

FIG. 1a shows a perspective view of the individual components of a first embodiment of a module with a functional element which is formed as a gas generator;

FIG. 1b shows a module in the view in FIG. 1a with a gas generator mounted and additional insulating means;

FIG. 5a shows a perspective view of a fourth embodiment of a module with a functional element which is formed as a gas generator, and insulating means for the attachment rail, and FIG. 5b shows a module in the view in FIG. 5a with insulating means arranged on the attachment rail.

FIG. 1a shows a first embodiment of a module 1 with a functional element which is formed as a gas generator 2, in a perspective view, and components which are separated in terms of perspective for the sake of clarity.

Figure 2:
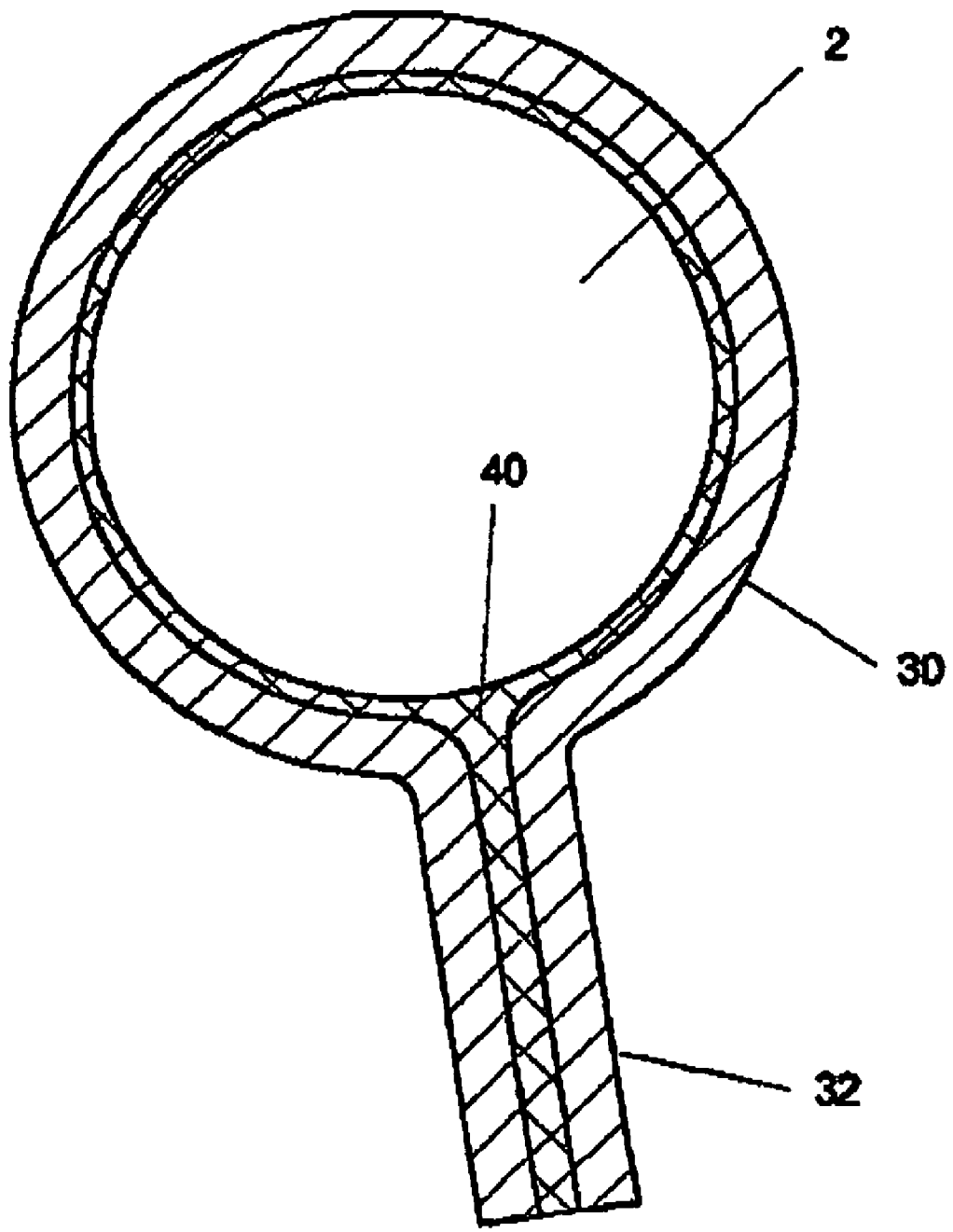
FIG. 2 shows a cross section through a holding device with insulating means.

The gas generator 2 which is formed so as to be essentially cylindrical has, at one of its ends, an electrically controlled trigger device 20, and it can be arranged in an insulating element 40 which is formed so as to be hollow cylindrical. This insulating element 40 completely engages around the outer surface 21 of the cylindrical gas generator as a separate insulating means. The insulating element 40 can be positioned in a holding device 30, the outer surface of the insulating element 40 being in mechanical contact with the holding device 30, at least in certain sections. The outer surface 21 which is formed so as to be electrically conductive at least in certain sections is electrically insulated here from the holding device 30 by the insulating element 40.

The hollow cylindrical insulating element is fabricated here from electrically insulating material, for example plastic, rubber, paper, cardboard, textiles or leather.

In the embodiment illustrated in FIG. 1, the holding device 30 forms, together with a mounting device 31, the securing device 3 which serves to mechanically secure the gas generator 2 to the bodywork of a motor vehicle. For this purpose, the holding device 30 has a flange 32, directed away from the insulating element 40, and holes 34. Separate attachment means 33 can be arranged on the flange 32 in order to secure the holding device 30 to the mounting device 31.

For this purpose, the separate attachment means 33 have a rail 330 which extends in the length of the flange 32, can be fitted onto the flange and has attachment elements 331 which are arranged on the rail. The attachment elements 331 which are arranged with the spacing of the holes on the rail 330 can be lead through the holes 34 of the flange 32 and through holes 34' in the mounting device which correspond to them, in order to secure the holding device 30 mechanically to the mounting device 31.

The attachment elements 331 can be formed here either as detachable or non-detachable connecting means in the form of screws, rivets or latching elements.

The mounting device 31 can have a plurality of forms corresponding to the geometric peripheral conditions present in the motor vehicle.

In the embodiment illustrated in FIGS. 1a to 5a, the mounting device 31 has the same form in each case. A receiving section 37 in the form of a half shell is provided for receiving the essentially cylindrical holding device 30, the flange 32 coming to rest flush with a corresponding attachment section with the holes 34' of the mounting device 31.

Furthermore, the mounting device has a plurality of attachment sections which are designed, for example, in the form of attachment hooks 35 or attachment feet 36. In order to secure the mounting device 31 mechanically to the bodywork of a motor vehicle, the attachment hooks 35 are hooked into assigned reciprocals in the bodywork. The attachment feet 36 have holes for feeding through further separate attachment means, for example in the form of screws or rivets for detachably or non-detachably securing the attachment foot 36 to the bodywork of the vehicle.

FIG. 1b shows the module from FIG. 1a, the hollow cylindrical insulating element 40 being arranged, together with the gas generator 2, in the interior of the holding device 30. Identical components are provided here with identical reference symbols.

In addition to the hollow cylindrical insulating element 40, further insulating means for providing electrical insulation between the gas generator 2 and the bodywork of a motor vehicle are illustrated in FIG. 1b.

An insulating rail 41 may be provided on the mounting device 31 in the region of the holes 34'. This insulating rail 41 extends essentially along the mounting region of the flange 32 of the holding device 30. In this context, it has essentially hollow cylindrical elements in the sections of the holes 34', which elements engage through the holes 34' of the mounting device 31 and the holes 34 of a mounted holding device 30. These hollow cylindrical elements of the insulating rail 41 are, like the insulating rail itself, fabricated from electrically insulating material, for example plastic, rubber, paper, cardboard, textiles or leather. The insulating rail 41 thus prevents direct mechanical and thus electrical contact between the attachment elements 331 of the separate attachment means 33 and the mounting device 31.

Furthermore it is advantageous to use the airbag of an airbag device which is usually manufactured from an electrically non-conductive textile material as insulating means for providing electrical insulation between the gas generator 2 and the bodywork of a motor vehicle.

For this purpose, an airbag section 42, 42' with correspondingly arranged holes 34''' may be respectively provided between the rail 330—which can be fitted on—of the separate attachment means 33 and the flange 32 of the holding device 30 and between the flange 32 of the holding device 30 and the mounting device 31, for the purpose of feeding through the attachment elements 331.

These airbag sections 42, 42' are usually arranged in the edge region of an airbag in such a way that the gas generator 2 is located in the interior of an airbag.

In FIG. 1b, only the sections 42, 42' of the airbag are illustrated for the sake of clarity. In this way, the airbag which is present in any case in an airbag module can be used as an insulating means in the sense of the invention.

FIG. 2 shows a cross section through a holding device 30 of an essentially cylindrical functional element 2, for example in the form of a gas generator. In a way which is similar to the holding devices 30 shown in FIGS. 1a and 1b, the holding device 30 has a flange 32 directed away from the functional element 2. An essentially hollow cylindrical insulating element 40 is arranged between the functional element 2 and the holding device 30. This insulating element 40 can be manufactured, on the one hand, as a separate component from one of the electrically insulating materials mentioned above. On the other hand, it is also conceivable to provide the sections of the holding device 30 which are in mechanical contact with the functional element 2 with an electrically insulating layer in the form of a surface coating or rubber. Correspondingly, the sections of the functional element which are in mechanical contact with the holding device 30 can also be provided with such a layer.

Figure 3:
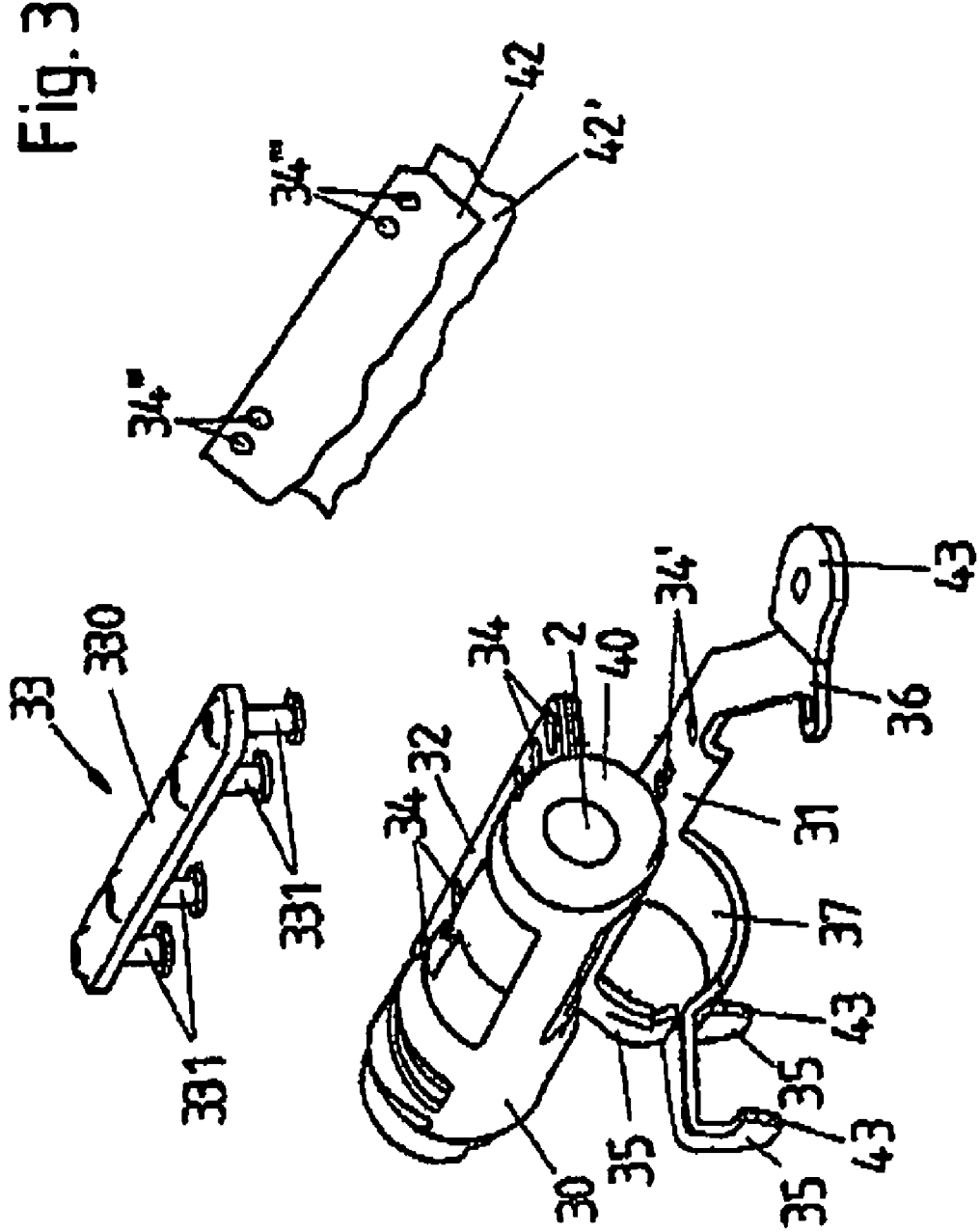
FIG. 3 shows a perspective view of a second embodiment of a module with a functional element which is formed as a gas generator.

FIG. 3 shows a further embodiment of the module from FIG. 1b. In contrast to the module in FIG. 1b, there is no insulating rail 41 arranged as insulating means on the mounting device 31. In the variant shown, the mounting device 31 is provided with insulating shoes 43, on the attachment hooks 35 and mounting feet 36 which are in mechanical contact with the bodywork of a motor vehicle, in such a way that the mounting device 31, and thus also the gas generator which is secured to it by means of the holding device 30, is electrically insulated from the bodywork of the vehicle. For this purpose, the insulating shoes 43 engage around the attachment hooks 35 and the mounting feet 36 at least in the regions which are in contact with the bodywork of the vehicle when the mounting device 31 is attached.

The insulating shoes 43 can in turn be manufactured from any of the electrically insulating materials mentioned above. A particularly advantageous variant provides for the insulating shoes 43 to be integrally attached through injection molding with an electrically insulating plastic. In addition, the insulating shoes 43 can serve for damping the oscillations of the securing device 3 given suitable elasticity.

Figure 4:
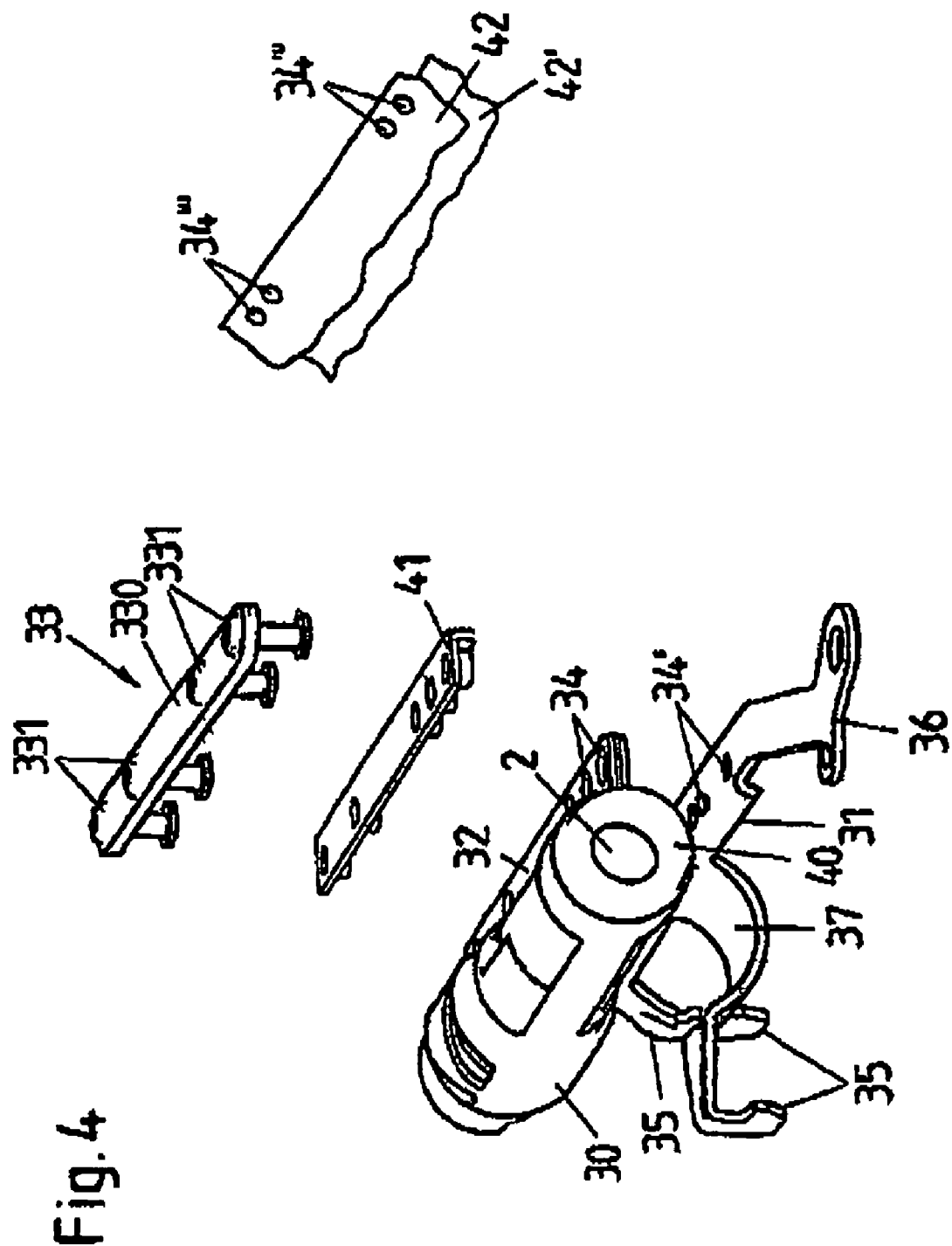
FIG. 4 shows a perspective view of a third embodiment of a module with a functional element which is formed as a gas generator.

FIG. 4 shows a further embodiment of the module in FIG. 1b. In contrast to the module in FIG. 1b, an insulating rail 41 is provided between the rail 330—which can be fitted on—of the separate attachment means 33 and the flange 32 of the holding device 30. This insulating rail 41 also has essentially hollow cylindrically shaped elements in the region of the holes 34, which elements engage through the holes 34 of the holding device 30 and the holes 34' of the mounting device 31 in the mounted position. This prevents electrically conductive mechanical contact between the attachment elements 331 and the flange 32 of the holding device 30. At least the airbag section 42' which is to be arranged between the flange 32 and the mounting device 31 is absolutely necessary to provide electrical insulation between these two elements.

FIG. 5a and FIG. 5b show a further variant of an insulating rail 41 according to the embodiment from FIG. 4. The insulating rail 41 can be arranged here along the rail 330—which can be fitted on—of the separate attachment means 33. Said rail is arranged on the surface facing the flange 32 of the holding device 30 during mounting, and has hollow cylindrical elements which engage around the attachment elements 331 in such a way that in the mounted position of the attachment elements 331 there is no electrically conductive contact between the attachment elements 331 and the flange 32 of the holding device 30 and/or the mounting device 31. In this embodiment also, at least the airbag section 42' which is to be arranged between the flange 32 and the mounting device 31 is absolutely necessary for providing electrical insulation between these two elements.

The various insulating means 40, 41, 42, 42', 43 which are shown in FIGS. 1a to 5b can be used in different combinations. The central feature in each case is exclusively the fact that the insulating means act in such a way that the flow of electrical direct current or alternating current between the functional element 2 and the bodywork of a motor vehicle is reliably prevented.

In addition to the embodiments shown in FIGS. 1a to 5b, it is also conceivable for the electrical insulation between the functional element 2 and the bodywork of a motor vehicle to be ensured by virtue of the fact that the securing device 3 is manufactured at least in certain sections from an electrically non-conductive material, for example a suitable plastic. With respect to the embodiment of the holding device 30 and mounting device 31 forming the securing device 3 which is shown in FIGS. 1a to 5b it is possible, in order to bring about the electrical insulation of the functional element 2, to manufacture the holding device 30 and/or the mounting device 31 from an electrically non-conductive material.

| List of reference numbers | |
|---|---|
| 1 | Module |
| 2 | Functional element, gas generator |
| 3 | Securing device |
| 20 | Electrical trigger device |
| 21 | Outer surface of gas generator |
| 30 | Holding device |
| 31 | Mounting device |
| 32 | Flange of holding device |
| 33 | Separate attachment means |
| 34, 34", 34''' | Holes |
| 35 | Attachment hooks |
| 36 | Attachment feet |
| 37 | Receiving section |
| 40 | Hollow cylindrical insulating element |
| 41 | Insulating rail |
| 42, 42' | Airbag section |
| 43 | Insulating shoes |
| 330 | Rail which can be fitted on |
| 331 | Attachment elements |

The invention claimed is:

1. A module for a vehicle occupant protection device of a motor vehicle comprising:

a gas generator which can be activated in the event of the vehicle crashing, and a securing device for mechanically securing the gas generator to bodywork of the vehicle, wherein the gas generator includes an electrically conductive outer surface which is electrically insulated from the bodywork of the vehicle, and wherein the gas generator includes an electrical trigger device for activating the gas generator in the event of a crash, and wherein the electrical trigger device is isolated from an electrical interaction with the bodywork of the motor vehicle.

2. A module for a vehicle occupant protection device of a motor vehicle, comprising:

a gas generator which can be activated in the event of the vehicle crashing; and a securing device for mechanically securing the gas generator to bodywork of the vehicle, wherein the gas generator includes an electrically conductive outer surface which is electrically insulated from the bodywork of the vehicle, wherein the securing device comprises an electrically non-conductive material so that the gas generator is electrically insulated from the bodywork of the vehicle, wherein the module includes means for electrically insulating the gas generator from the bodywork of the vehicle, and wherein the insulating means comprises a non-detachable plastic surface coating applied to a surface of the gas generator.

3. The module as claimed in claim 1, wherein the module includes means for electrically insulating the gas generator from the bodywork of the vehicle.

4. The module as claimed in claim 3, wherein the insulating means electrically insulate the gas generator from the securing device and/or electrically insulate the securing device from the bodywork of the vehicle.

5. The module as claimed in claim 3, wherein the insulating means comprises electrically insulating materials on the gas generator in mechanical contact with the securing device.

6. The module as claimed in claim 5, wherein the securing device includes a holding device for receiving the gas generator and a mounting device which can be mechanically secured to the holding device and can be mechanically secured to the bodywork of the vehicle.

7. The module as claimed in claim 6, wherein the insulating means are arranged so that the gas generator is electrically insulated from the holding device and/or the holding device is electrically insulated from the mounting device and/or the mounting device is electrically insulated from the bodywork of the vehicle.

8. The module as claimed in claim 6, wherein the holding device is designed to receive an essentially cylindrical gas generator.

9. The module as claimed in claim 8, wherein the insulating means comprises a hollow cylindrical insulating element which can be arranged between the gas generator and the holding device.

10. The module as claimed in 9, wherein the holding device includes a flange, directed away from the gas generator, for attaching the holding device to the mounting device.

11. The module as claimed in claim 10, wherein the flange and/or the mounting device include an attachment means for mechanically securing the holding device to the mounting device.

12. The module as claimed in claim 10, wherein the flange of the holding device is mechanically secured to the mounting device by a separate attachment means.

13. The module as claimed in claim 12, wherein the flange includes a plurality of holes for receiving a portion of the attachment means, the mounting device comprising correspondingly arranged holes.

14. The module as claimed in claim 13, wherein the attachment means includes a first rail which can be fitted onto the flange and includes non-detachable or detachable attachment elements, arranged at a distance from the holes of the flange, for securing the holding device to the mounting device.

15. The module as claimed in claim 14, wherein the insulating means includes an insulating rail for providing electrical insulation between the attachment means and the holding device.

16. A module for a vehicle occupant protection device of a motor vehicle, comprising:

a gas generator which can be activated in the event of the vehicle crashing;

a securing device for mechanically securing the gas generator to bodywork of the vehicle, the securing device including a holding device for receiving the gas generator and a mounting device which can be mechanically secured to the holding device and can be mechanically secured to the bodywork of the vehicle, the mounting device includes an attachment element to mechanically secure the holding device to the mounting device; and an insulating rail for providing electrical insulation between the attachment element and the holding device, wherein the gas generator includes an electrically conductive outer surface which is electrically insulated from the bodywork of the vehicle, wherein the insulating rail extends between a first rail and a flange of the holding device, the insulating rail in a region of holes for the attachment element engaging in holes of the holding device and/or in holes of the mounting device in such a way that the attachment element is electrically insulated from the holding device and/or from the mounting device.

17. The module as claimed in claim 15, wherein the insulating rail extends between the flange of the holding device and the mounting device, wherein the insulating rail in the region of the holes for the attachment elements engages in the holes of the mounting device and/or in the holes of the holding device in such a way that the attachment elements are electrically insulated from the holding device.

18. The module as claimed in claim 14, wherein a section of an airbag for an airbag module is arranged between the flange of the holding device and the first rail which can be fitted on and/or between the flange of the holding device and the mounting device.

19. The module as claimed in claim 18, wherein holes for receiving the attachment elements are provided in the airbag.

20. The module as claimed in claim 18, wherein the insulating means comprises a portion the airbag arranged on the holding device.

21. The module as claimed in claim 1, wherein the vehicle occupant protection device comprises an airbag module.

22. The module as claimed in claim 1, wherein the gas generator is positioned to supply gas to a seatbelt pretensioning device.

23. The module as claimed in claim 1, wherein the securing device comprises an electrically non-conductive plastic coating configured to electrically insulate the gas generator from the bodywork of the vehicle.

* * * * *